(12) United States Patent
Shimizu et al.

(10) Patent No.: US 8,082,449 B2
(45) Date of Patent: Dec. 20, 2011

(54) INFORMATION PROCESSING APPARATUS, INFORMATION PROCESSING METHOD, INFORMATION PROCESSING PROGRAM AND RECORDING MEDIUM

(75) Inventors: Kohji Shimizu, Fukuoka (JP); Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1099 days.

(21) Appl. No.: 10/915,333

(22) Filed: Aug. 11, 2004

(65) Prior Publication Data
US 2005/0071648 A1   Mar. 31, 2005

(30) Foreign Application Priority Data

| Aug. 12, 2003 | (JP) | 2003-292012 |
| Aug. 12, 2003 | (JP) | 2003-292013 |
| Aug. 12, 2003 | (JP) | 2003-292014 |
| Aug. 12, 2003 | (JP) | 2003-292015 |
| Aug. 12, 2003 | (JP) | 2003-292016 |
| Mar. 19, 2004 | (JP) | 2004-081476 |
| Aug. 6, 2004 | (JP) | 2004-230105 |

(51) Int. Cl.
*G06F 11/30* (2006.01)
*G06F 12/14* (2006.01)

(52) U.S. Cl. ........ 713/187; 713/176; 713/182; 713/193; 726/10; 380/243; 380/282

(58) Field of Classification Search ................. 713/187, 713/176, 193, 182; 726/10; 380/243, 282
See application file for complete search history.

(56) References Cited

U.S. PATENT DOCUMENTS
5,392,351 A   2/1995 Hasebe et al.
(Continued)

FOREIGN PATENT DOCUMENTS
CN   1363077 A   8/2002
(Continued)

OTHER PUBLICATIONS

U.S. Appl. No. 11/250,405, filed Oct. 17, 2005, Shimizu.
(Continued)

*Primary Examiner* — Edan Orgad
*Assistant Examiner* — Kari Schmidt
(74) *Attorney, Agent, or Firm* — Oblon, Spivak, McClelland, Maier & Neustadt, L.L.P.

(57) ABSTRACT

An information processing apparatus including a recording medium setting part in which a recording medium is set is provided. The information processing apparatus includes a validity determination part for determining validity of a program by determining validity of validity determination data, wherein the program and the validity determination data are stored in the recording medium, wherein the validity determination part determines the validity of the validity determination data on the basis of a first comparison between a hash code generated from the program and a hash code obtained by decoding the validity determination data and a second comparison between machine specific data that is specific to the information processing apparatus and machine specific data obtained by decoding the validity determination data.

26 Claims, 17 Drawing Sheets

U.S. PATENT DOCUMENTS

| | | | |
|---|---|---|---|
| 5,642,199 | A | 6/1997 | Ukai et al. |
| 5,673,373 | A | 9/1997 | Nosaki et al. |
| 5,812,130 | A * | 9/1998 | Van Huben et al. .......... 715/764 |
| 6,111,953 | A * | 8/2000 | Walker et al. ................ 380/51 |
| 6,463,535 | B1 * | 10/2002 | Drews ........................ 713/176 |
| 6,542,943 | B2 * | 4/2003 | Cheng et al. ................ 710/36 |
| 7,310,520 | B2 | 12/2007 | Kim |
| 7,503,072 | B2 * | 3/2009 | Hughes et al. ................ 726/26 |
| 2002/0013832 | A1 * | 1/2002 | Hubbard ....................... 709/220 |
| 2002/0042884 | A1 * | 4/2002 | Wu et al. ...................... 713/201 |
| 2002/0060736 | A1 * | 5/2002 | Wakao et al. ................ 348/207 |
| 2002/0152394 | A1 | 10/2002 | Kadoya |
| 2002/0194476 | A1 * | 12/2002 | Lewis et al. .................. 713/169 |
| 2003/0086111 | A1 | 5/2003 | Akiyoshi |
| 2003/0145200 | A1 * | 7/2003 | Eden ............................ 713/161 |
| 2003/0145218 | A1 | 7/2003 | Hutchison |
| 2003/0218765 | A1 | 11/2003 | Ohishi et al. |
| 2004/0021890 | A1 | 2/2004 | Hirai et al. |
| 2004/0057067 | A1 | 3/2004 | Ohishi et al. |
| 2004/0057074 | A1 | 3/2004 | Ohishi et al. |
| 2004/0075857 | A1 | 4/2004 | Akiyoshi et al. |
| 2004/0109188 | A1 | 6/2004 | Akiyoshi et al. |
| 2004/0109568 | A1 * | 6/2004 | Slick et al. ................... 380/277 |
| 2004/0125414 | A1 | 7/2004 | Ohishi et al. |
| 2004/0128532 | A1 | 7/2004 | Ohishi et al. |
| 2004/0130747 | A1 | 7/2004 | Ohishi et al. |
| 2005/0063027 | A1 * | 3/2005 | Durst et al. .................. 359/2 |

FOREIGN PATENT DOCUMENTS

| | | |
|---|---|---|
| EP | 1 014 256 A2 | 6/2000 |
| EP | 1 091 275 A2 | 4/2001 |
| EP | 1 267 515 A2 | 12/2002 |
| JP | 5-257816 | 10/1993 |
| JP | 7-287655 | 10/1995 |
| JP | 9-134330 | 5/1997 |
| JP | 10-255394 | 9/1998 |
| JP | 2000-322254 | 11/2000 |
| JP | 2001-229018 | 8/2001 |
| JP | 2002-84383 | 3/2002 |
| JP | 2003-5859 | 1/2003 |
| JP | 2003-39770 | 2/2003 |
| JP | 2003-87239 | 3/2003 |
| JP | 2003-122588 | 4/2003 |
| JP | 2003-179707 | 6/2003 |
| JP | 2003-195758 | 7/2003 |
| JP | 2003-223329 | 8/2003 |
| WO | WO 00/77614 A2 | 12/2000 |
| WO | WO 03/055132 A1 | 7/2003 |

OTHER PUBLICATIONS

U.S. Appl. No. 11/372,073, filed Mar. 10, 2006, Shimizu, et al.
U.S. Appl. No. 11/509,601, filed Aug. 25, 2006, Ando et al.
U.S. Appl. No. 11/216,013, filed Sep. 1, 2005, Ando et al.
U.S. Appl. No. 10/626,608, filed Jul. 25, 2003, Akiyoshi et al.
U.S. Appl. No. 10/756,315, filed Jan. 14, 2004, Hirai et al.
U.S. Appl. No. 10/798,437, filed Mar. 12, 2004, Tanaka et al.
U.S. Appl. No. 10/807,323, filed Mar. 24, 2004, Ando.
Japanese Office Action issued against related Japanese patent application JP2004-230105 issued Aug. 31, 2010.
Office Action issued Nov. 11, 2010, in Japan Patent Application No. 2004-230106 (with English translation).

* cited by examiner

FIG.12

```
<?xml version="1.0" encoding="UTF-8"?>
<jnlp codebase="http://www.ricoh.com/bsdk/pdid">  //LOCATION OF JNLP FILE, "HTTP:" INDICATES NETWORK
<jnlp codebase="sdcard://bsdk/pdid" />  //LOCATION OF JNLP FILE, "SDCARD:" INDICATES SD CARD
  <information>
    <title>Puzzle15</title>  //APPLICATION NAME
    <vendor>BSDK Providers Inc.</vendor>  //VENDOR NAME
    <telephone>092-441-####</telephone>  //TELEPHONE NUMBER
    <fax>092-411-####</fax>  //FAX NUMBER
    <product-id>0123456</product-id>  //PRODUCT ID
  </information>
  //RESOURCE INFORMATION
  <resources>
    <bsdk version="1.2+" />
    <jar href="puzzle15.jar" />
  </resources>
  //INFORMATION ON APPLICATION
  <application-desc main-class="com.bsdkproviders.Puzzle15">
    <argument>Arg1</argument>
    <argument>Arg2</argument>
  </application-desc>
  //INFORMATION ON INSTALL
  <install mode="auto" >  //MODE="AUTO" INDICATES AUTOMATIC INSTALL
  <install mode="manual">  //MODE="MANUAL" INDICATES MANUAL UI INSTALL
    <destination path="sdcard/badk/pdid" />  //PATH="SDCARD" INDICATES INSTALL TO SD CARD
    <destination path="hdd/bsdk/pdid" />  //PATH="HDD" INDICATES INSTALL TO HDD
  </install>
  //INFORMATION ON UPDATE
  <update>
    <mail address="xxx@yyy.zzz.co.jp" />  //NOTIFICATION MAIL ADDRESS WHEN UPDATING
  <update>
</jnlp>
```

INFORMATION PROCESSING APPARATUS, INFORMATION PROCESSING METHOD, INFORMATION PROCESSING PROGRAM AND RECORDING MEDIUM

BACKGROUND OF THE INVENTION

1. Field of the Invention

The present invention relates to an information processing apparatus such as information technology apparatus including an information processing function as a main function and an electrical apparatus including an information processing function as a secondary function, and relates to an information processing method, an information processing program and a recording medium such as a CD-ROM. An example of the information technology apparatus that includes the information processing function as the main function is a personal computer, and an example of the electronic apparatus including the information processing function as the secondary function is an image forming apparatus such as copier/printer/scanner/facsimile/compound machine (to be also referred to as combined machine) whose information processing function is remarkably advanced in recent years.

2. Description of the Related Art

In recent years, a compound machine that includes a copying function, a printer function, a scanner function and a facsimile function is coming onto the market. When the compound machine functions as a copier or a printer, an image is to be printed on a printing paper. When the compound machine functions as a copier or a scanner, an image is read from a document. When the compound machine functions as a facsimile, the compound machine receives or sends an image via a telephone line. Japanese laid-open patent application No. 2002-84383 discloses a technology relating to the compound machine.

The compound machine executes various information processing by using various programs such as applications or platforms. The programs are usually preinstalled in the compound machine. If the programs can be installed in the compound machine after the compound machine has been shipped, the convenience of customers can be improved. For this purpose, the compound machine may be configured such that the programs can be installed from a memory card storing the programs that is inserted in a card slot of the compound machine. The compound machine configured like this is useful for a maker and a vendor of the compound machine in which the maker allows the vendor to develop a program for the compound machine.

However, in the above-mentioned configuration, there are problems of unauthorized copy and tampering for the program. As for the unauthorized copy of the program, there is a problem in that sales profit of the program may be lost. As for the tampering of the program, the program may be invalidity updated so that there is a problem in that a rental profit for the compound machine may be lost. The former problem is a matter of life and death for the vendor, and the latter problem is a matter of life and death for the maker.

SUMMARY OF THE INVENTION

An object of the present invention is to prevent unauthorized copy and tampering of a program stored in a recording medium such as a memory card that is used for installing the program into an information processing apparatus such as an image forming apparatus.

The above-object is achieved by an information processing apparatus including a recording medium setting part in which a recording medium is set, the information processing apparatus including:
 a validity determination part for determining validity of a program by determining validity of validity determination data, wherein the program and the validity determination data are stored in the recording medium;
 wherein the validity determination part determines the validity of the validity determination data on the basis of a first comparison between a hash code generated from the program and a hash code obtained by decoding the validity determination data and a second comparison between machine specific data that is specific to the information processing apparatus and machine specific data obtained by decoding the validity determination data.

In the information processing apparatus, the validity determination data may be generated by encrypting the hash code generated from the program and the machine specific data that is specific to the information processing apparatus.

The information processing apparatus may further include a storing part for storing the machine specific data that is specific to the information processing apparatus into the recording medium set in the recording medium setting part. In addition, the information processing apparatus may further include a storing part for storing the validity determination data into the recording medium set in the recording medium setting part.

The information processing apparatus may further include an installing part for installing the program determined to be valid into the information processing apparatus. Further, the information processing apparatus may further include an updating part for updating the program in the information processing apparatus.

The above-object is also achieved by an information processing method performed in an information processing apparatus including a recording medium setting part in which a recording medium is set, the information processing method including:
 a validity determination step of determining validity of a program by determining validity of validity determination data, wherein the program and the validity determination data are stored in the recording medium;
 wherein the information processing apparatus determines the validity of the validity determination data on the basis of a first comparison between a hash code generated from the program and a hash code obtained by decoding the validity determination data and a second comparison between machine specific data that is specific to the information processing apparatus and machine specific data obtained by decoding the validity determination data.

The above-object is also achieved by an information processing program for causing an information processing apparatus to perform information processing, the information processing apparatus including a recording medium setting part in which a recording medium is set, the information processing program including:
 validity determination program code means for determining validity of a program by determining validity of validity determination data, wherein the program and the validity determination data are stored in the recording medium;
 wherein the validity determination program code means determines the validity of the validity determination data on the basis of a first comparison between a hash code generated from the program and a hash code obtained by decoding the validity determination data and a second comparison between machine specific data that is specific to the information processing apparatus and machine specific data obtained by decoding the validity determination data.

According to the present invention, unauthorized copy and tampering of a program stored in a recording medium such as a memory card can be prevented, wherein the recording medium is used for installing the program into an information processing apparatus such as an image forming apparatus.

BRIEF DESCRIPTION OF THE DRAWINGS

Other objects, features and advantages of the present invention will become more apparent from the following detailed description when read in conjunction with the accompanying drawings, in which:

FIG. 12 shows an example of a sentence structure of a JNLP file;

DETAILED DESCRIPTION OF THE PREFERRED EMBODIMENTS

In the following, embodiments of the present invention are described with reference to figures.

Figure 22:
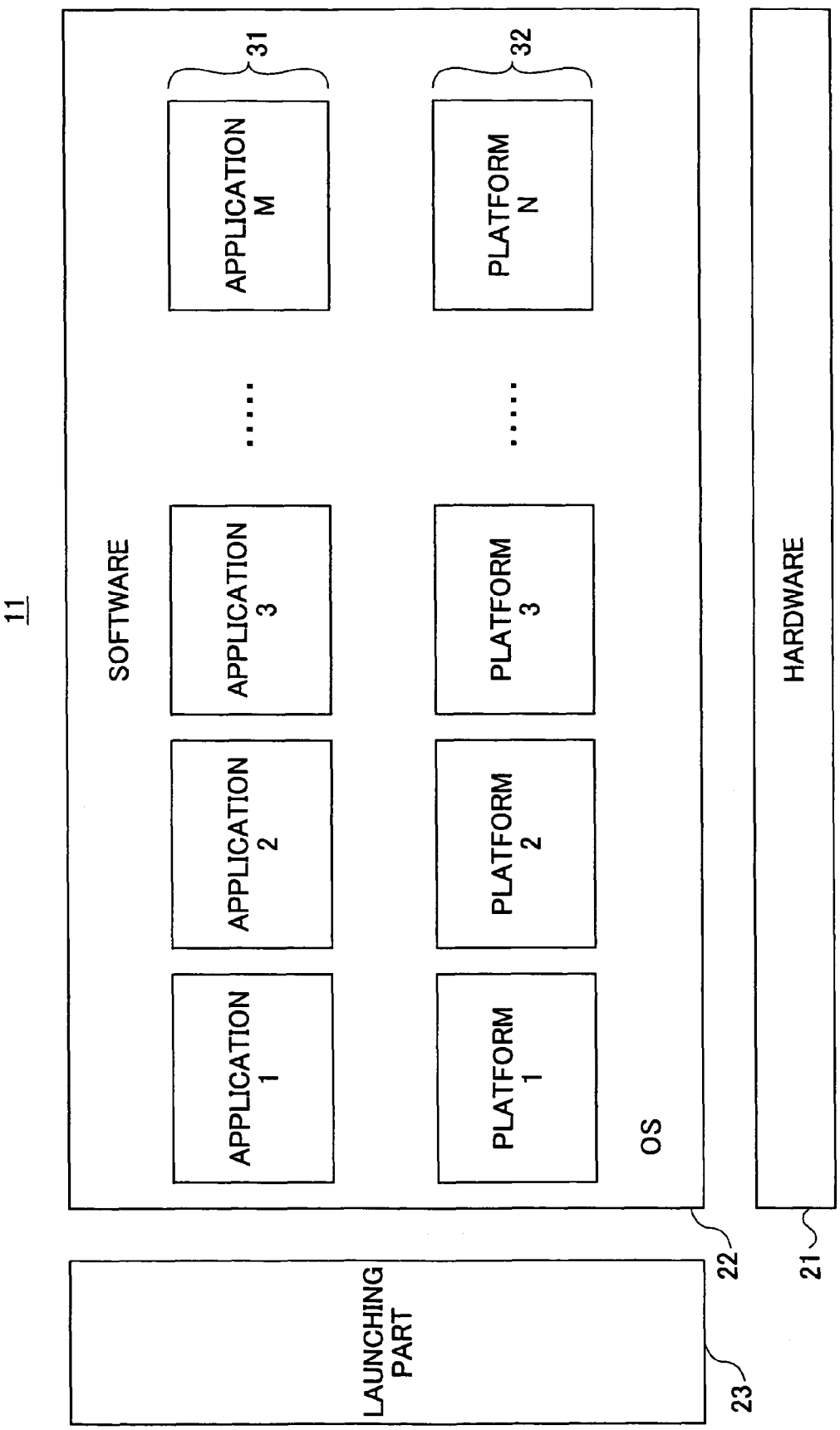
FIG. 22 shows an information processing apparatus of an embodiment of the present invention.

FIG. 22 shows an information processing apparatus 11 of an embodiment of the present invention. The information processing apparatus 11 includes hardware 21, software 22 and a launching part 23.

The hardware of the information processing apparatus 11 includes an information processing part, a communication part and an operation display part. The information processing part includes a CPU, a ROM, a RAM and a HDD, the communication part includes a MODEM and a NIC, and the operation display part includes a keyboard, a mouse and a display.

The software 22 of the information processing apparatus 11 includes applications 31 and platforms 32. The platforms 32 include a module for controlling the information processing part, a module for controlling the communication part, a module for controlling the operation display part, a module for performing authentication processing, a module for management of user information, and a module for management of the system. The programs are performed in parallel process by process by an OS (operating system) such as UNIX.

The launch part 23 is initially executed when the power of the information processing apparatus 11 is turned on. Accordingly, the OS is launched and the applications 31 and the platforms 32 are launched. The programs are stored in the HDD or in the memory card, and are loaded from the HDD or the memory card into a RAM so that the programs are executed.

Examples of the information processing apparatus 11 shown in FIG. 22 are an information technology apparatus that includes an information processing function as a main function and an electrical apparatus including an information processing function as a secondary function. An example of the information technology apparatus is a personal computer, and an example of the electronic apparatus including the information processing function as the secondary function is an image forming apparatus such as copier/printer/scanner/facsimile/compound machine (to be also referred to as combined machine) whose information processing function is remarkably advanced in recent years. In the following, an compound machine 101 that is an example of the information processing apparatus 11 is described.

Figure 1:
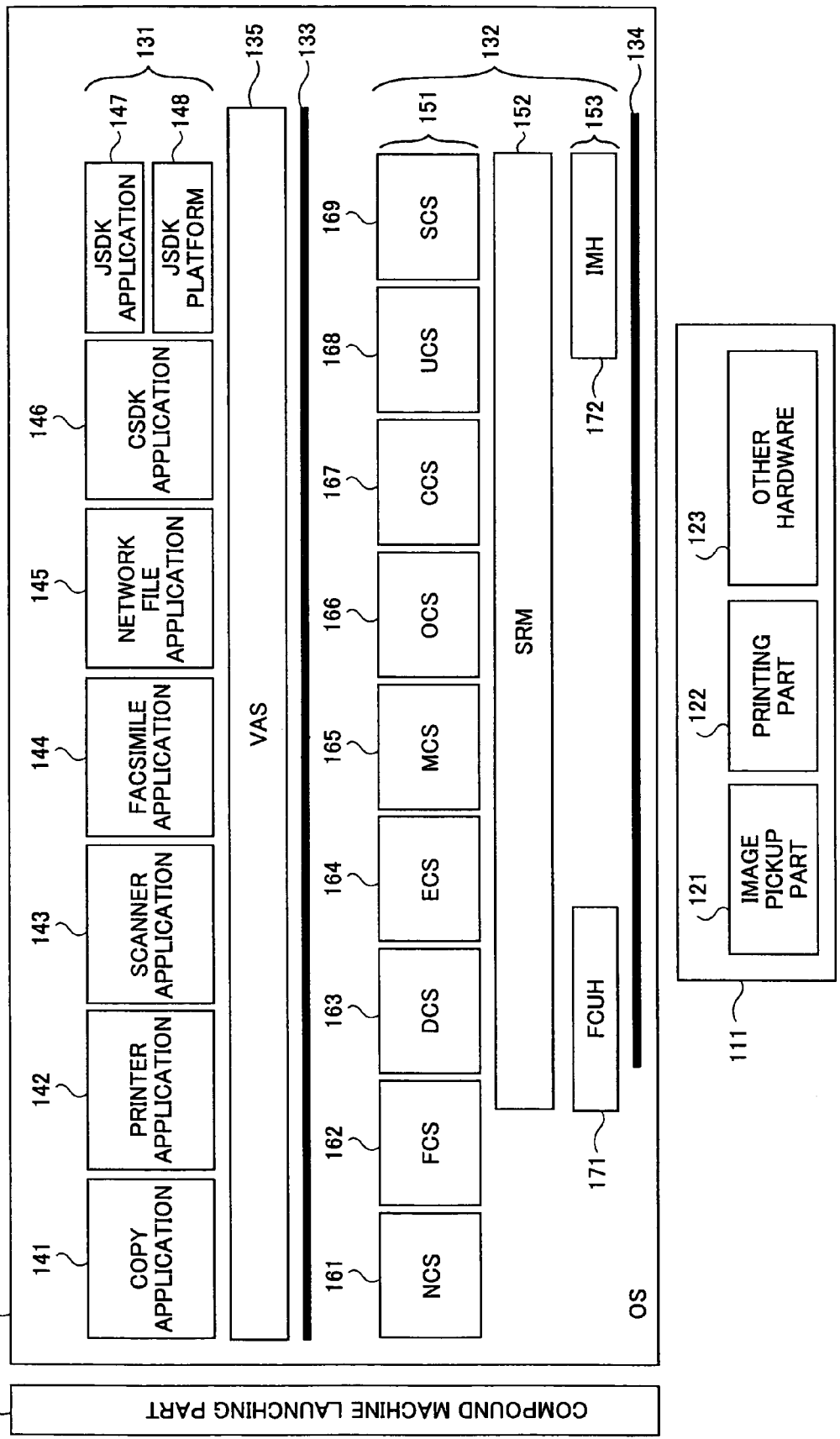
FIG. 1 shows a compound machine of an embodiment of the present invention.

FIG. 1 shows the compound machine 101 of the embodiment of the present invention. The compound machine 101 shown in FIG. 1 includes various hardware 111, various software 112 and a compound machine launching part 113.

The hardware 111 of the compound machine 101 includes an image pickup part 121, a printing part 122, and other hardware 123. The image pickup part 121 is hardware for reading an image (image data) from a document. The printing part 122 is hardware for printing the image on a printing paper.

The software 112 of the compound machine 101 includes various applications 131 and various platforms 132. These programs are executed in parallel as processes by an OS (operating system) such as UNIX.

The applications 131 include a copy application 141 that is an application for copying, a printer application 142 that is an application for printing, a scanner application 143 that is an application for scanning, a facsimile application 144 that is an application for facsimile, and a network file application 145 that is an application for network file.

An application can be developed by using a dedicated SDK (software development kit). An application developed by using the SDK is called a SDK application. As the dedicated SDK, "CSDK" for developing an application by a C language and "JSDK" for developing an application by using a Java language are provided. An application developed by using CSDK is called a CSDK application, and an application developed by using JSDK is called a JSDK application. The compound machine 101 in FIG. 1 includes a CSDK application 146 and a JSDK application 147. The compound machine 101 further includes a JSDK platform 148 that mediates between the JSDK application 147 and other programs.

The platforms 132 include control services 151, a system resource manager 152, and handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of the NCS 161 intermediates network communications. The process of FCS 162 provides APIs for facsimile. The process of DCS 163 controls delivery processes of stored documents. The process of ECS 164 performs control for the image pickup part 121 or the printing part 122. The process of MCS 165 performs control for the memory and the hard disk drive. The process of the OCS 166 performs control of the operation panel. The process of CCS 167 performs control for authentication process and billing process. The process of the UCS 168 performs control relating to management of user information. The process of the SCS 169 performs control of management of the system.

A virtual application service (VAS) 135 exists as software for performing mediation between the applications 131 and the platforms 132. The VAS 135 operates as a server process for each application that functions as a client, and operates as a client process for the platform that functions as a server. The VAS 135 has a wrapping function for hiding the platform 132 from the application 131. In addition, the VAS has a function for absorbing version differences between the platform 132 and APIs of the applications.

The compound machine launching part 113 is executed first when the power is turned on. Accordingly, the OS such as UNIX is launched, and the applications 131 and the platforms 132 are launched. These programs are stored in the hard disk drive or in the memory card, and are read from the hard disk drive or from the memory card, and are loaded into a memory.

Figure 2:
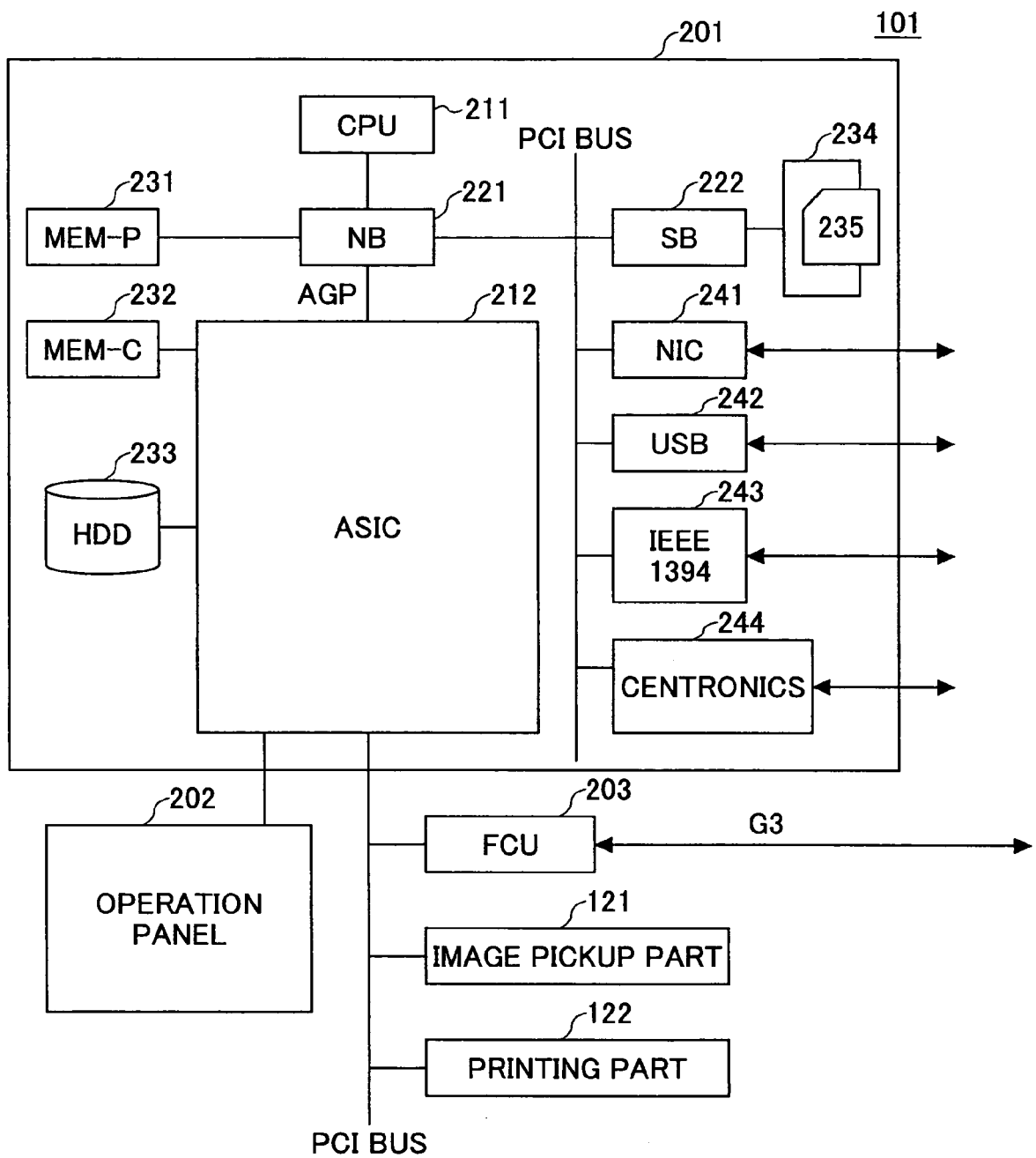
FIG. 2 is a hardware block diagram of the compound machine shown in FIG. 1.

FIG. 2 is a hardware block diagram of the compound machine 101 shown in FIG. 1. The hardware 111 of the compound machine 101 includes a controller 201, an operation panel 202, a facsimile control unit (FCU) 203, an image pickup part 121 and a printing part 122.

The controller 201 includes a CPU 211, an ASIC 212, a NB 221, a SB 222, a MEM-P 231, a MEM-C 232, a HDD (hard disk drive) 233, a memory card slot 234, a NIC (network interface controller) 241, a USB device 242, an IEEE 1394 device 243 and a Centronics device 244.

The CPU 211 is an IC for various information processing. The ASIC 212 is an IC for various image processing. The NB 221 is a north bridge for the controller 201. The SB 222 is a south bridge for the controller 201. The MEM-P 231 is a system memory for the compound machine 101. The MEM-C 232 is a local memory of the compound machine 101. The HDD 233 is a storage of the compound machine 101. The memory card slot 234 is a slot for setting the memory card 235. The NIC 241 is a controller for network communications by MAC addresses. The USB device 242 is a device for providing connection terminals of USB standard. The IEEE device 243 is a device for providing connection terminals of IEEE 1394 standard. The Centronics device 244 is a device for providing connection terminals of Centronics.

The operation panel 202 is hardware (operation part) by which the user inputs data into the compound machine 101, and also hardware (display part) for obtaining output data from the compound machine 101.

Figure 3:
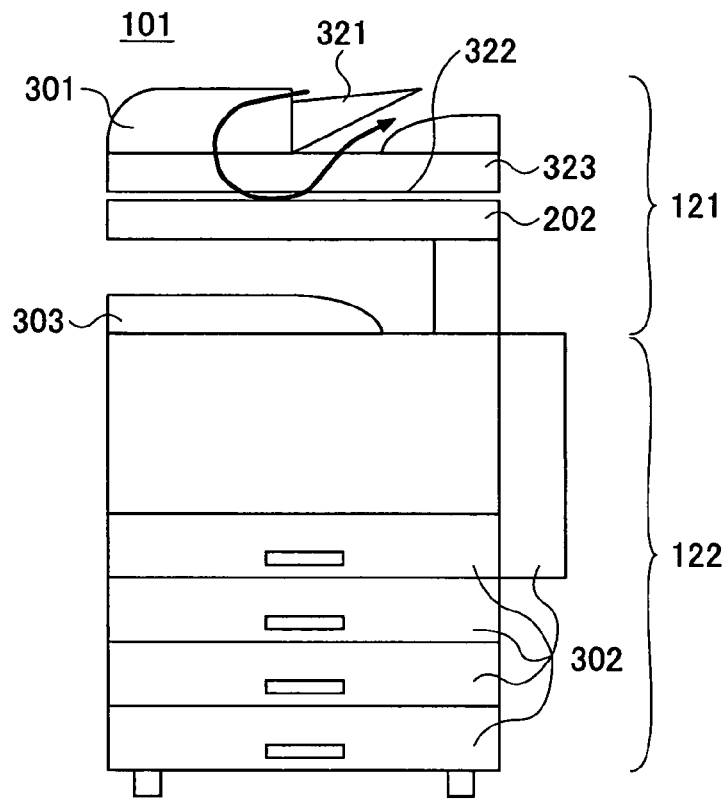
FIG. 3 is an external view of the compound machine of FIG. 1.

FIG. 3 is an external view of the compound machine 101 of FIG. 1. FIG. 3 shows a position of the image pickup part 121, a position of the printing part 122 and a position of the operation panel 202. FIG. 3 further shows a document setting part 301 on which the documents are set, a paper feed part 302 for feeding papers, and a paper ejecting part 303 for ejecting a printing paper.

Figure 4:
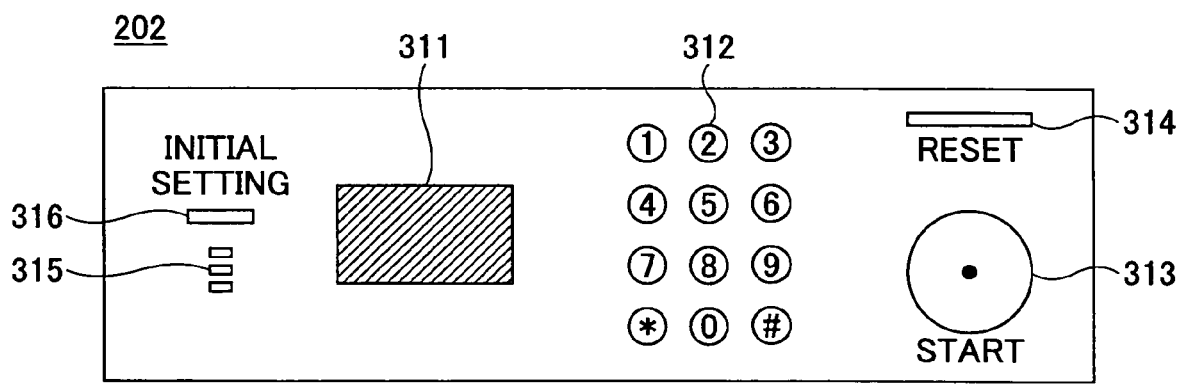
FIG. 4 shows an operation panel.

As shown in FIG. 4, the operation panel 202 includes a touch panel 311, ten keys 312, a start button 313, a reset button 314, function keys 315 and an initial setting button 316. The touch panel 311 is hardware (touch operation part) for inputting data by touch operation, and is also hardware (image display part) for displaying image. The ten keys 312 are hardware for input numbers by key operations. The start button 313 is hardware for performing start operation by button operation. The reset button 314 is hardware for performing reset operation by button operation. The function keys 315 are hardware for displaying an operation screen of the CSDK application or the JSDK application by button operation. The initial setting button 316 is hardware for displaying an initial setting screen by button operation.

The document setting part 301 includes an ADF (automatic document feeder) 321, a flat bed 322, and a flat bet cover 323. The paper feeding part 302 includes four feeding trays. The paper ejecting part 303 includes one ejecting tray.

(Compound Machine Launching Part)

In the following, the compound machine launching part 113 of FIG. 1 is described.

Figure 5:
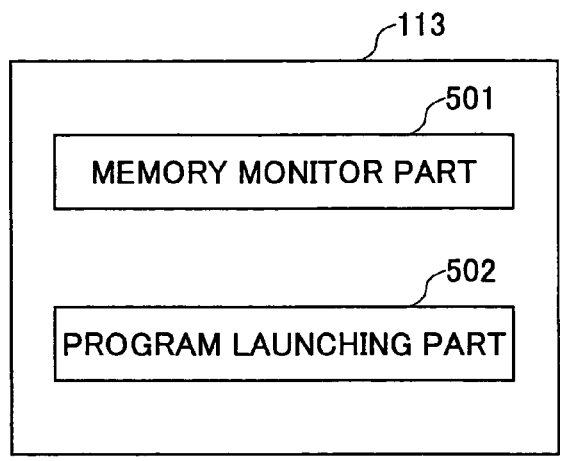
FIG. 5 shows an compound machine launching part.

As shown in FIG. 5, the compound machine launching part 113 includes a memory monitoring part 501 and a program launch part 502.

When the power of the compound machine 101 is turned on, BIOS and boot loader that form the memory monitoring part 501 are launched, so that the OS that is the UNIX is launched. Next, a launch processing program that forms the program launch part 502 is launched, so that the applications and the platforms 132 are launched. When the UNIX is launched, a kernel of the UNIX is launched, a root file system is unfolded, so that file systems relating to the applications and the platforms are mounted on the root system file.

(Memory Card)

In the following, the memory card slot 234 and the memory card 235 shown in FIG. 2 are described. The memory card slot 234 is a slot to which the memory card 235 is inserted, in which the memory card 235 stores programs such as the applications 131 or the platforms 132. The programs stored in the memory card 235 are read and loaded in the MEM-P 231 or the MEM-C 232.

As the memory card 235, an SD (Secure Digital) memory card that is a kind of a flash memory card is used. By using the SD memory card, there is a merit in that large capacity memories can be obtained at a low cost. For the SD memory card, a SD memory card slot is used as the memory card slot 234.

Figure 6:
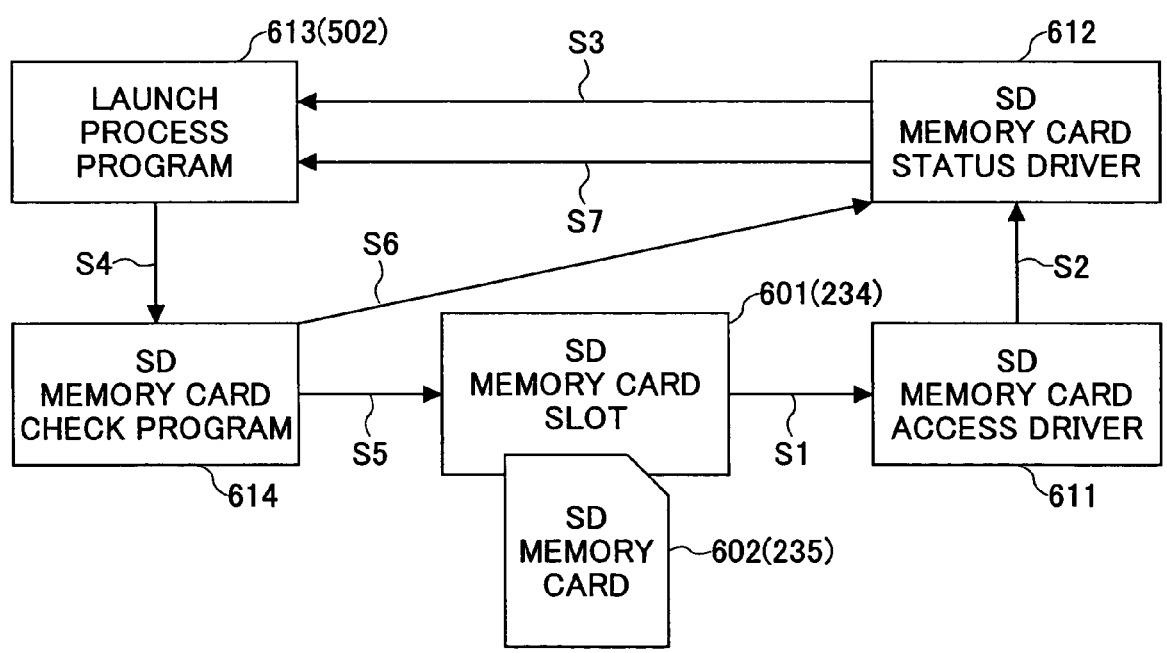
FIG. 6 shows software relating to a SD memory card slot and a SD memory card.

As shown in FIG. 6, the compound machine 101 includes a SD memory card access driver (SD access) 611, a SD memory card status driver (SD status) 612, a launch processing program 613, and a SD memory card check program (SD check) 614 as software relating to the SD memory card slot 601 and the SD memory card 602 (corresponding to memory card slot 234 and memory card 235).

The SD access 611 is a driver for performing access control for the SD memory card 602. More specifically, the SD access 611 detects insert/eject of the SD memory card 602, for example. SD status 612 is a driver for managing information of insert/eject/mount/unmount for the SD memory card. The launch processing program 613 is a program forming the program launch part 502 of FIG. 5. The SD check 614 is a program for performing mount/unmount of the SD memory card 602.

When the SD memory card 602 is inserted into the SD memory card slot 601, the SD access 611 detects that the SD memory card 602 is inserted in step 1, and SD access 611 notifies the SD status 612 of the event in step 2. In response to that, the SD status 612 manages information that indicates that the SD memory card 602 has been inserted, and notifies the launch processing program 613 that the SD memory card 602 has been inserted in step 3. In response to that, the launch processing program 613 launches the SD check 614 to mount the SD memory card 602. In response to that, the SD check 614 mounts the SD memory card 602 in step 5, and notifies the SD status 612 of the event in step 6. In response to that, the SD status 612 manages information indicating that the SD memory card 602 is mounted, and notifies the launch processing program 613 that the SD memory card 602 has been mounted in step 7.

When the SD memory card 602 is pulled out from the SD memory card slot 601, the SD access 611 detects that the SD memory card 602 has been pulled out in step 1, and SD access 611 notifies the SD status 612 that the SD memory card 602 has been pulled out in step 2. In response to that, the SD status 612 manages information that indicates that the SD memory card 602 has been pulled out, and notifies the launch processing program 613 that the SD memory card 602 has been pulled out in step 3. In response to that, the launch processing program 613 launches the SD check 614 to unmount the SD memory card 602 in step 4. In response to that, the SD check 614 unmounts the SD memory card 602 in step 5, and notifies the SD status 612 of the event in step 6. In response to that, the SD status 612 manages information indicating that the SD memory card 602 is unmounted, and notifies the launch processing program 613 that the SD memory card 602 has been unmounted in step 7.

By adopting the SD memory card, so-called hot insertion and removal of the card can be realized. That is, an operation for inserting the SD memory card 602 into the SD memory card slot 601 and an operation for removing the SD memory card 602 from the SD memory card slot 601 can be performed after the compound machine 101 is launched.

(Application Authentication Process)

In the following, an application authentication process is described.

Figure 7:
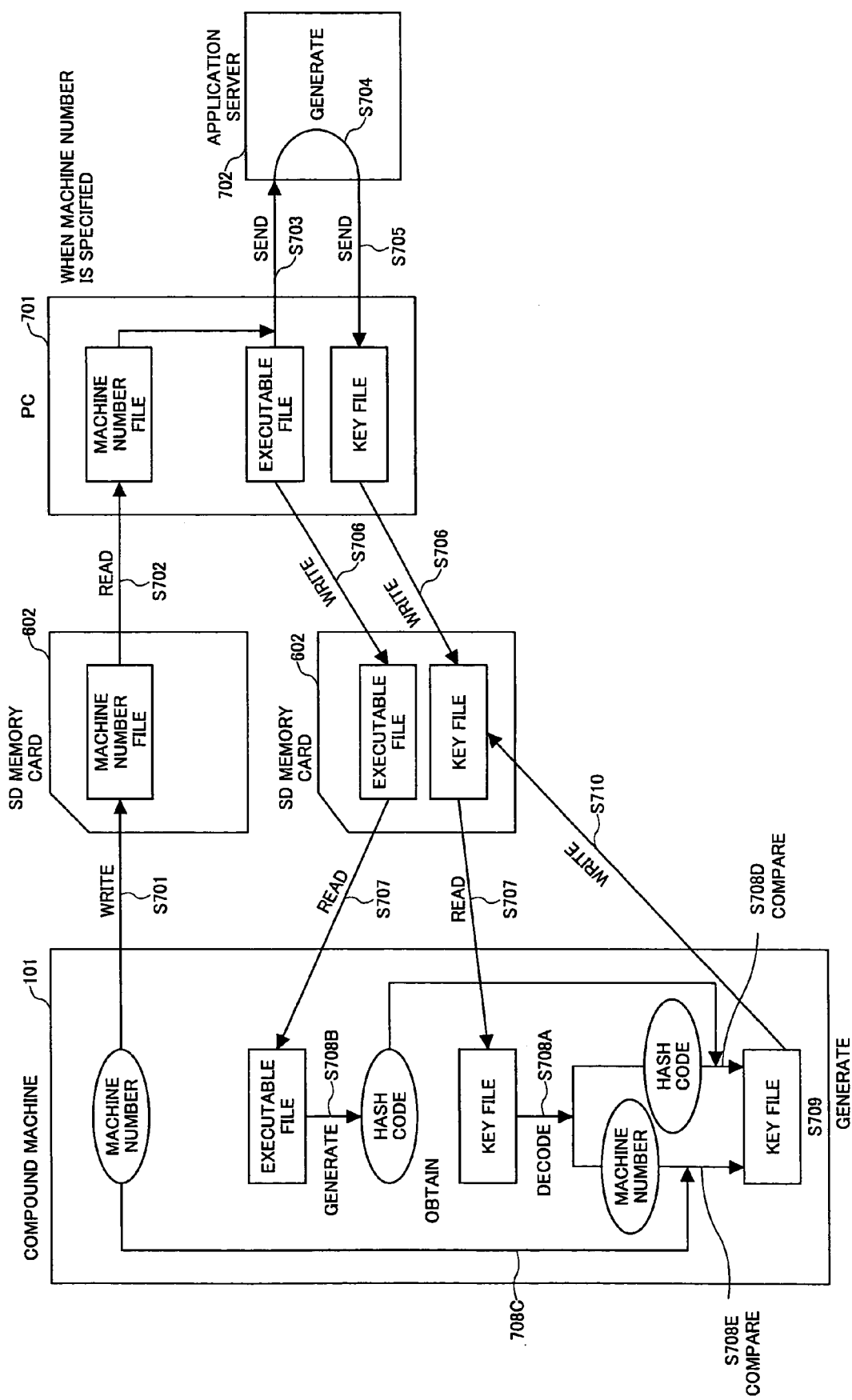
FIG. 7 is a figure for explaining an application authentication process.

FIG. 7 is a figure for explaining the application authentication process. The "application authentication process" is a series of processes performed for preventing unauthorized copy and tampering of the application before the application is loaded in the compound machine 101.

In a first step of the application authentication process, a process for obtaining a machine number is performed. First, an operator sets a SD memory card 602 in the SD memory card slot 601 of the compound machine 101 in which the application 131 is to be loaded. Next, the operator operates the compound machine 101 to store the machine number of the compound machine 101 in the SD memory card 602 by using an UI (user interface) displayed on the operation panel 202 by the VAS 135. Accordingly, the VAS 135 obtains the machine number of the compound machine 101 from the compound machine 101, and stores the machine number into the SD memory card 602 as a machine number file in step S701. The machine number of the compound machine 101 is a number specific to the compound machine 101.

In a second step of the application authentication process, an applying process for the application is performed. First, the operator sets the SD memory card 602 on which the first step has been performed in a PC 701. The PC 701 obtains the machine number file from the SD memory card 602 in step 702. Next, the operator performs an applying operation for the application on the PC 701. Accordingly, the PC 101 sends application data from the PC 701 to the application server 702 in step 703. The application data includes an executable file of the application, the machine number file, applicant data, applying date and time data, setting information of a type of the machine number, setting information of a number of the machine numbers. In response to that, the application server 702 generates a key file from the application data in step 704. The key file includes key data. The key data includes a hash code generated from the executable file, the machine number obtained from the machined number file, applicant data, applying date and time data, setting information of the type of the machine number, and setting information of the number of the machine numbers wherein these pieces of information are encrypted. Accordingly, the key file is sent from the application server 702 to the PC 701 in step 705. In response to that, the PC 701 stores the executable file and the key file into the SD memory card 602 in step 706. In a third step of the application authentication process, a validity determination process for the application is performed. First, the operator sets the SD memory card 602 on which the second step has been performed into the SD memory card slot 601 of the compound machine 101. The VAS 135 obtains the executable file and the key file in step 707 from the SD memory card 602. Then, the VAS 135 determines the validity of the executable file of the application by determining validity of the key data in the key file in step 708.

The step 708 is described in detail in the following. First, the VAS 135 decodes the key data obtained from the key file so as to obtain a hash code (to be referred as a hash code A) and a machine number (to be referred to as a machine number A) in step 708A. Next, the VAS 135 generates a hash code (to be referred to as a hash code B) from the executable file in step 708B. Next, the VAS 135 obtains a machine number (to be referred to as a machine number B) of the compound machine 101 from the compound number 101 in step 708C. Next, the VAS 135 determines whether the hash code A is valid by comparing the hash code A with the hash code B in step 708D. If the hash code A and the hash code B are the same, the hash code A is valid. If the hash code A and the hash code B are not the same, the hash code A is not valid. Next, the VAS 135 determines whether the machine number A is valid by comparing the machine number A with the machine number B in step 708E. If the machine number A and the machine number B are the same, the machine number A is valid. If the machine number A and the machine number B are not the same, the machine number A is not valid.

The VAS 135 determines whether the key data of the key file is valid based on the validity of the hash code A and the validity of the machine number A in step 708. If both of the hash code A and the machine number A are determined to be valid, the key data is determined to be valid. If one or both of the hash code A and the machine number A is not valid, the key data is not determined to be valid.

By performing the validity determination process (step 708D) for the hash code, tampering of the application can be checked. When the application is tampered, the hash codes do not agree. Accordingly, tampering of the application can be prevented.

By performing the validity determination process of the machine number (step 708E), invalid copy of an application can be checked. An invalidity copied application cannot be loaded into an compound machine which machine number is different from a machine number corresponding to the application. Thus, invalid copy of an application can be prevented.

Therefore, by performing the validity determination process of the application (step 708), tampering and illicit copy of an application can be prevented.

In step 704 in the second step, since there may be a case where a machine number cannot be obtained easily in the first step, a key file for which a corresponding machine has not been determined can be generated. In this case, the step 708E is always successfully performed, and the VAS 135 generates a new key file from the hash data B and the machine number B in step 709, so that the VAS 135 replaces the old key file with the new key file in the SD memory card 602 in step 710. The key file that does not correspond to any specific machine stores a machine number "0" that indicates that any corresponding machine is not determined. To adopt the key file corresponding to no specific machine, it is necessary that an operator who performs the application authentication process is trustworthy. However, since the key file stores the applicant data, responsibility of the operator is clear so that fraud by the operator is inhibited psychologically. Further, a key file that corresponds to any machine can be provided (to be referred to as "machine free").

As data used for preventing copy of the application, a MAC address or an IP address of the compound machine 101 can be used instead of the machine number of the compound machine 101. Any data that is specific to the compound machine 101 can be used as the data for preventing the copy. When the MAC address or the IP address of the compound machine 101 is used instead of the machine number, the MAC address and the IP address are stored in an MAC address file and an IP address file respectively.

Figure 8:
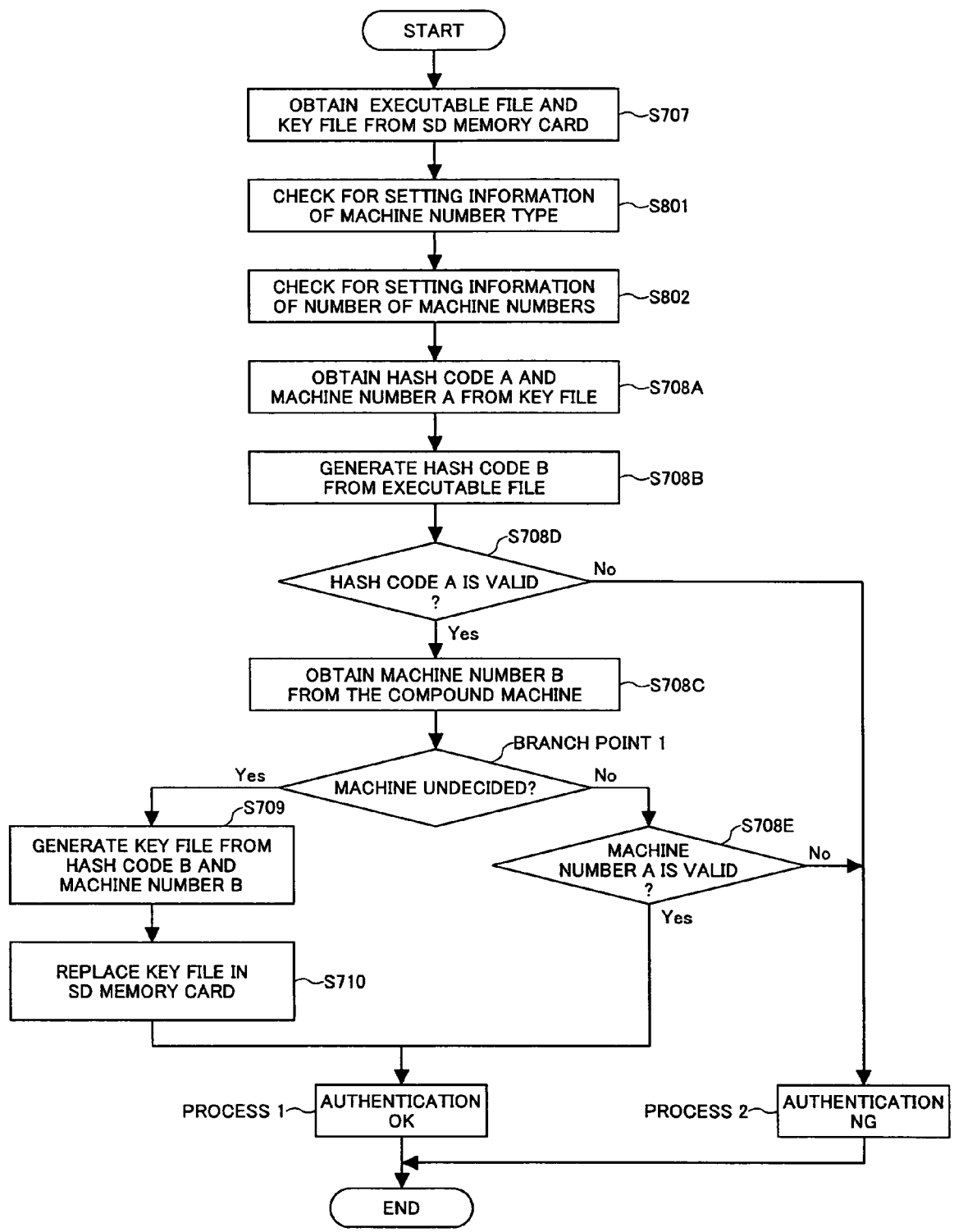
FIG. 8 is a flowchart of the process shown in FIG. 7 that is performed by the compound machine.

FIG. 8 shows a flowchart of the process shown in FIG. 7 that is performed by the compound machine 101. Processes of S707, S708A, S708B, S708C, S708D, S708E, S709 and S710 in FIG. 8 correspond to processes of S707, S708A, S708B, S708C, S708D, S708E, S709 and S710 in FIG. 7 respectively. The branch point 1 in FIG. 8 is a determination point whether a corresponding machine is decided or not. If any corresponding machine is not decided, the steps 709 and 710 are performed. In the case where a corresponding machine is already decided, if both of the hash code A and the machine number A are determined to be valid, the authentication is determined to be "OK" (process 1). If any of the hash code A or the machine number A is determined to be invalid, the authentication is NG (process 2).

In a case where the key file includes setting information of the type of the machine number and setting information of a number of machine numbers wherein the setting information of the type of the machine number indicates that the machine number is "undecided", "decided" or "free" and the setting information of the number of machine numbers indicates a number of machine numbers, a check process (step 801) of the setting information of the type of the machine number and a check process (step 802) of the setting information of the number of machine numbers can be performed. If the machine number is "undecided" in step 801, the branch point 1 becomes "Yes". If the machine number is "decided" in step 801, the branch point 1 becomes "No". If the machine number is "free" in the step 801, the branch point 1 becomes "No" and the step 708E is always "Yes". If S802 is "N", N time loop processes are performed hereinafter.

Figure 9:
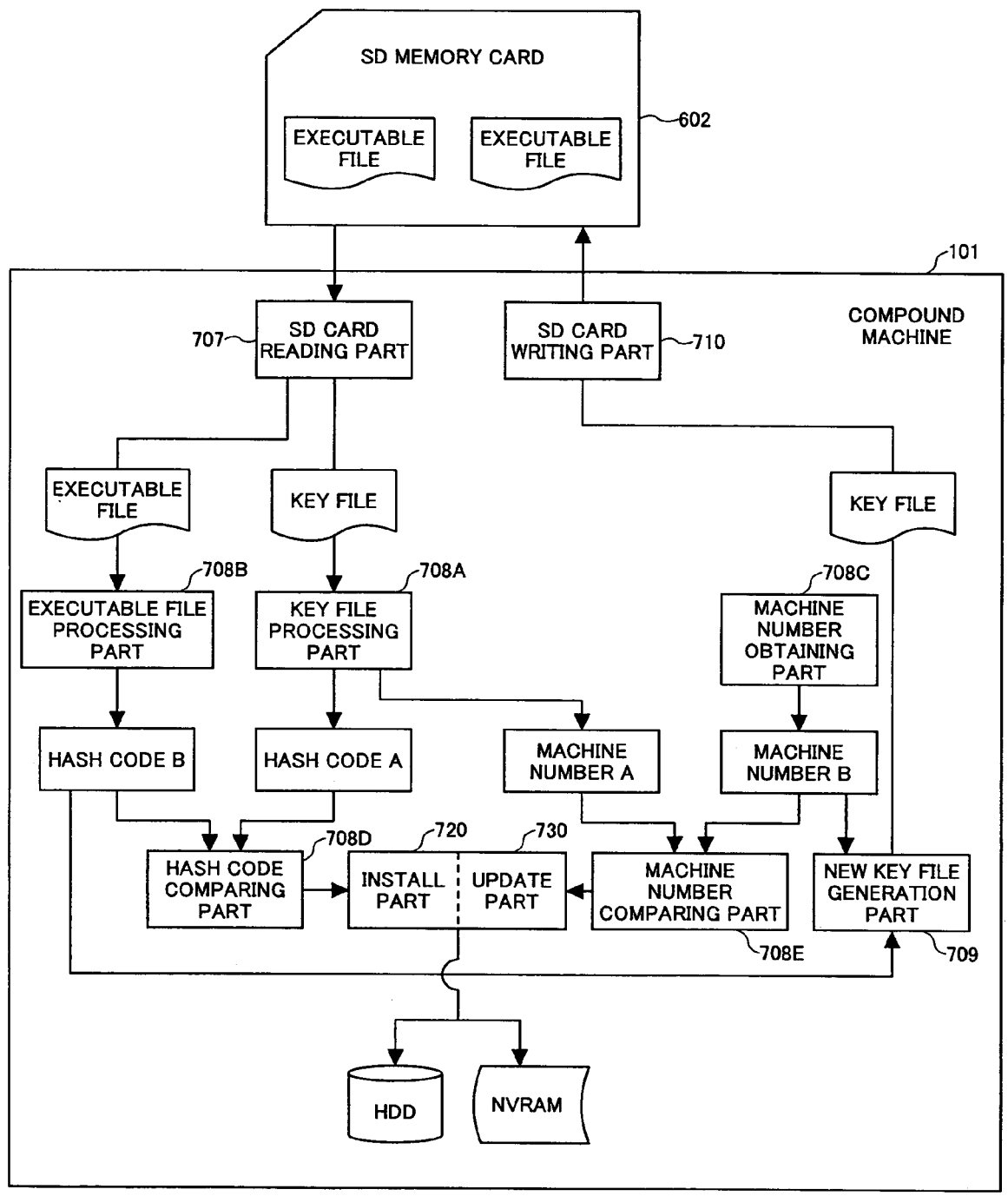
FIG. 9 is a functional block diagram corresponding to the process shown in FIG. 7 performed by the compound machine.

FIG. 9 shows a functional block diagram corresponding to processes shown in FIG. 7 performed by the compound machine 101. A SD card reading part 707 is a functional block for performing the process of S707. A key file process part 708A is a functional block for performing the process of S708A. An executable file processing part 708B is a functional block for performing the process of S708B. A machine number obtaining part 708C is a functional block for performing the process of S708C. A hash code comparing part 708D is a functional block for performing the process of S708D. A new key file generation part 709 is a functional block for performing the process of S709. A SD card writing part 710 is a functional block for performing the process of S710. An install part 720 is a functional block for installing an application determined to be valid into a HDD or a NVRAM of the compound machine 101. An update part 730 is a functional block for updating an application installed in the HDD or the NVRAM.

Figure 10:
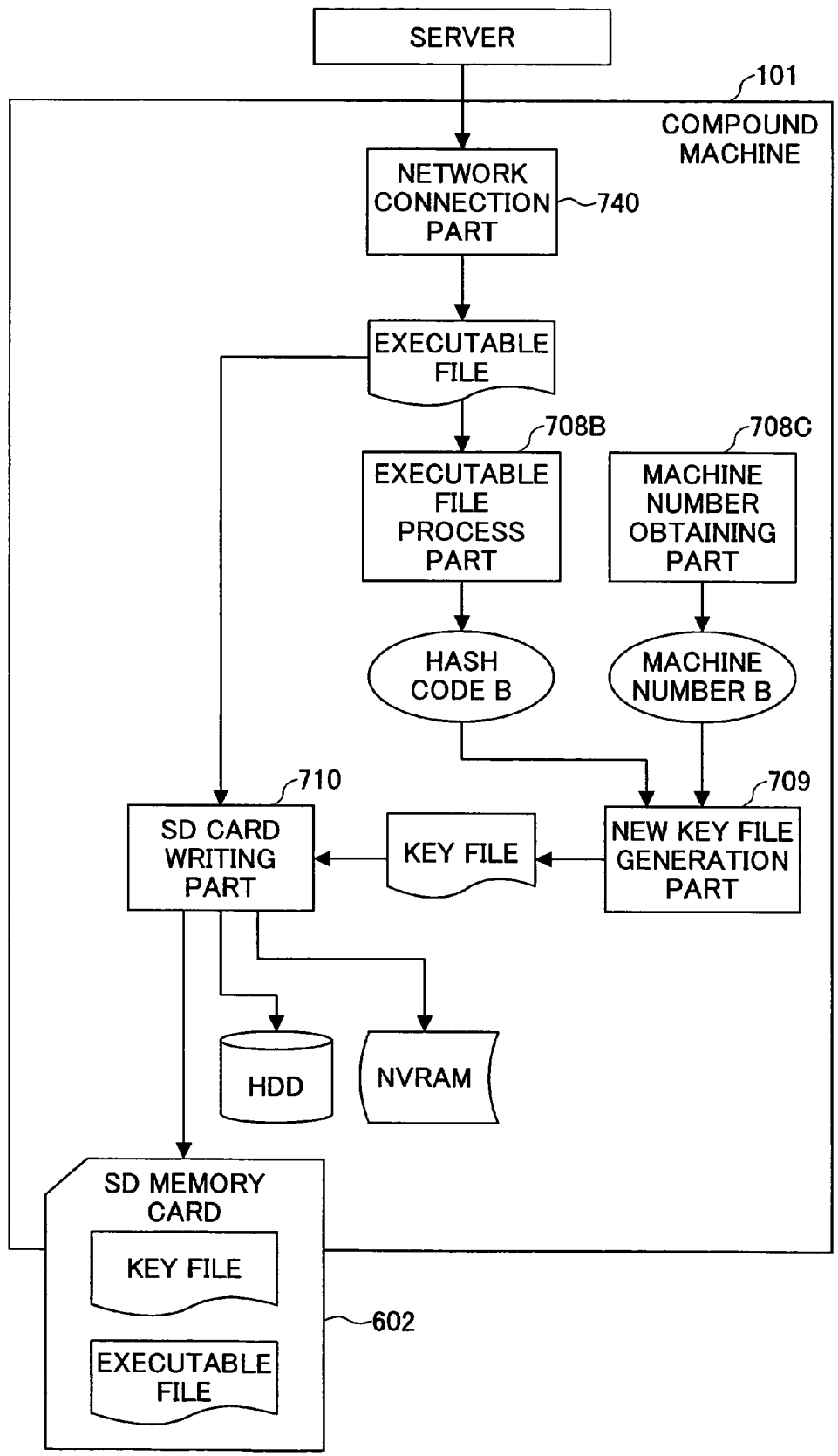
FIG. 10 shows a functional block diagram of a modified example of the process of FIG. 7.

The compound machine 101 may be provided with a function for obtaining an executable file from a network and storing the executable file in the SD memory card 602. In this case, like the case of "machine is undecided", the processes of S709 and S710 are performed. FIG. 10 shows a functional block diagram corresponding to this case. A network connection part 740 obtains the executable file from a network. An executable file process part 708B performs S708B, a machine number obtaining part 708C performs S708C, a new file generation part 709 performs S709, and a SD card writing part 710 performs S710. The SD card writing part 710 has a function for storing the executable file and the key file into the SD memory card 710.

Figure 11:
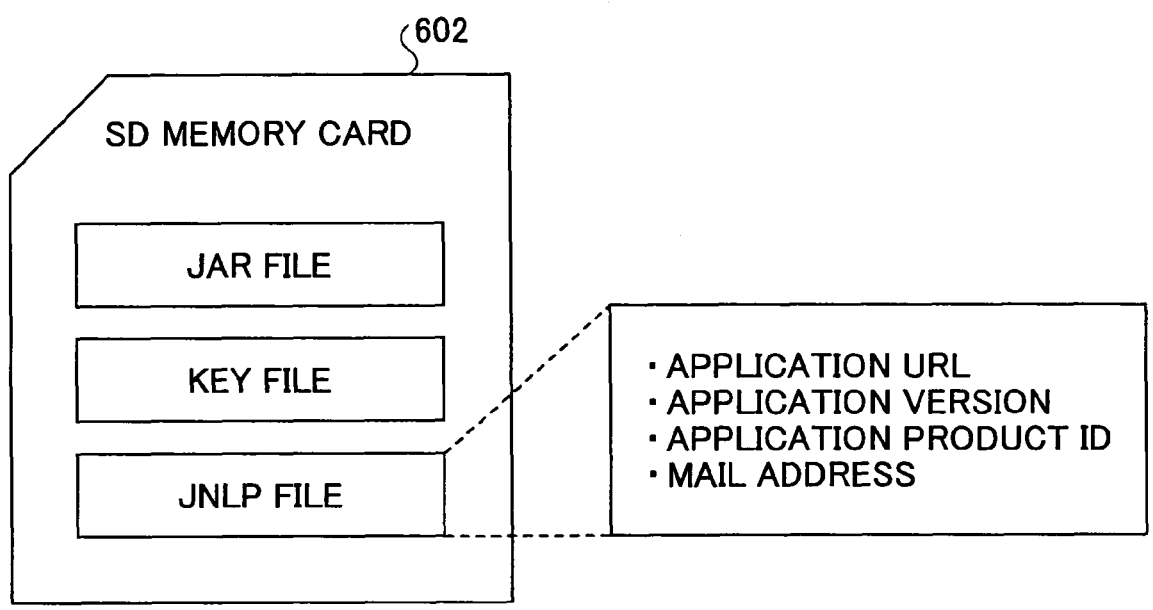
FIG. 11 is a figure for explaining files in the SD memory card.

In the following, a case where a JSDK application 147 is used as an application is described. In this case, as shown in FIG. 11, the SD memory card 602 to be set in the compound machine 101 stores a JAR file, a key file corresponding to the JAR file, and a JNLP file corresponding to the JAR file. The JAR file is an executable file of the JSDK application 147. The JNLP file is in one-to-one correspondence with the JAR file, and the JNLP file includes information for defining the JAR file. In this example, as shown in FIG. 11, the JNLP file stores a URL of the JSDK application 147, a version of the JSDK application 147, a product ID of the JSDK application 147 and a mail address for notifying update. The JNLP file is an XML file, and a format of the JNLP file is in conformity to a JNLP standard. FIG. 12 shows an example of a sentence structure of a JNLP file.

Figure 13:
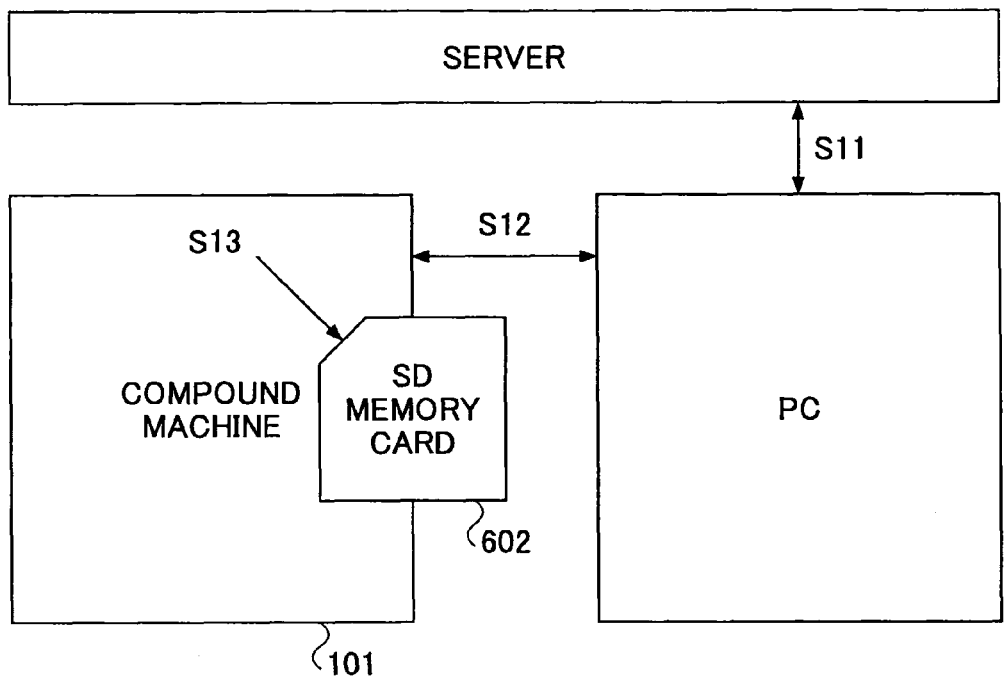
FIG. 13 is a figure for explaining how to store a file in the SD memory card.
Figure 14:
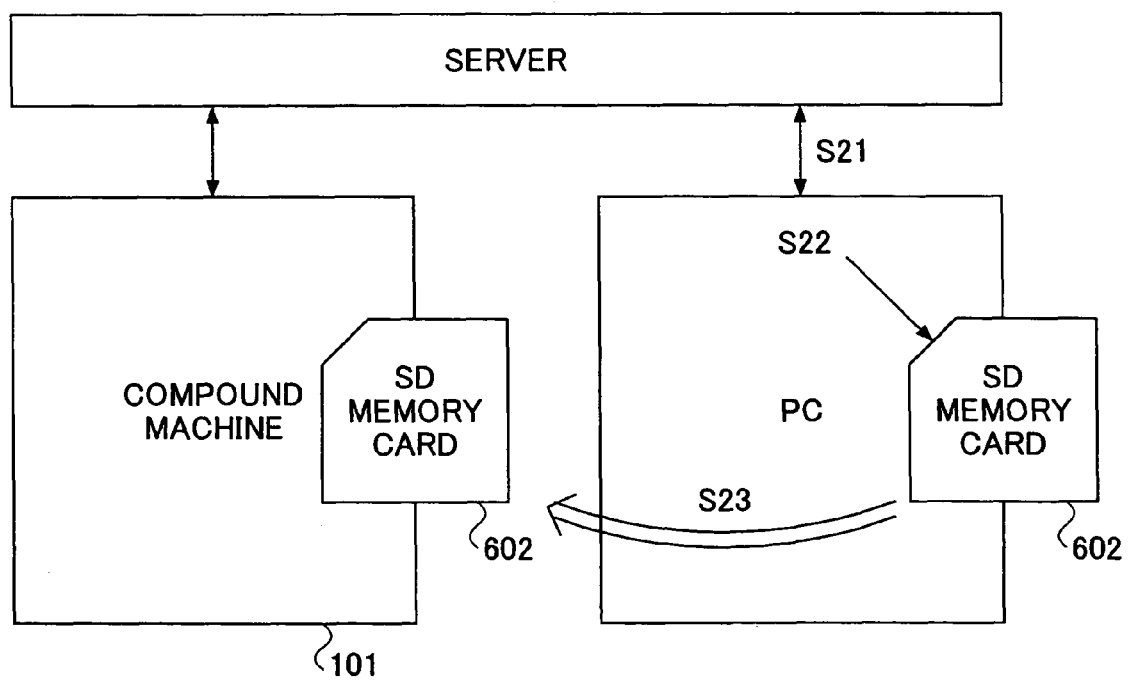
FIG. 14 is a figure for explaining how to store a file in the SD memory card.

As shown in FIG. 13, the JAR file, the key file and JNLP file are obtained from a server by a PC in step 11 as shown in FIG. 13. Then, the files are transferred to the compound machine 101 from the PC in step 12. Then, the files are stored in the SD memory card 602 by the compound machine 101 in step 13. Alternatively, as shown in FIG. 14, the PC obtains the files from the server in step 21, and the PC stores the files in the SD memory card 60 in step 22. In the former case, the operator inserts the SD memory card 602 in the compound machine 101 from the beginning. In the latter case, the operator removes the SD memory card from the PC and inserts the SD memory card into the compound machine 101 (step 23). Also in these cases, the processes shown in FIGS. 7-9 and the processes shown in FIG. 10 may be performed.

Figure 15:
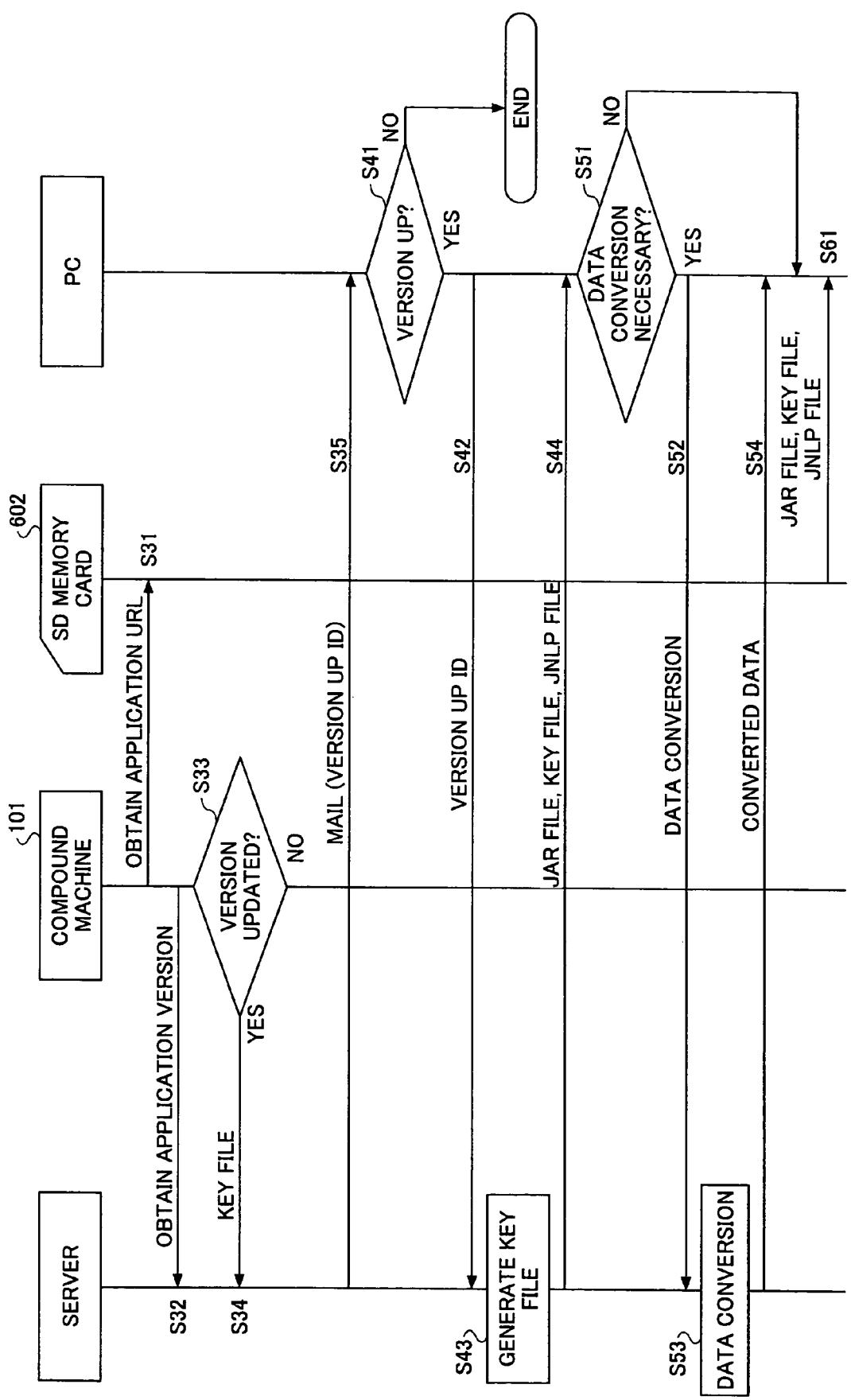
FIG. 15 is a sequence diagram for updating a JSDK application.

FIG. 15 is a sequence diagram for updating the JSDK application 147. First, the compound machine 101 obtains a URL of the JSDK application 147 from the SD memory card 602 in step 31, and the compound machine 101 obtains version information of the JSDK application 147 from the server in step 32. If the version of the JSDK application 147 has been updated (S33), the compound machine 101 sends a key file and a mail address (included in the JNLP file) to the server in step 34. In response to that, the server sends a mail to the PC to notifying the PC of updating of the JSDK application 147 in step 35 by using the mail address, wherein a version up ID is attached to the mail.

When an operator instructs the PC to perform upgrade (version up) of the JSDK application 147 on the screen of the PC in step 41, the PC sends the version up ID to the server in step 42. In response to that, the server generates a key file in step 43. Next, the server sends a new JAR file, a new key file and a new JNLP file to the PC in step 44.

If it is necessary to perform data conversion due to the upgrade (S51), the PC sends a data conversion request to the server in step 52. In response to that, the server executes data conversion in step 53. Next, the server sends converted data to the PC in step 54.

Next, the PC stores the new JAR file, the new key file and the new JNLP file in the SD memory card 602 in step 61. Then, the operator moves the SD memory card 602 from the PC to the compound machine 101.

(Image Forming Process)

Relating to the application authentication process, an image forming process performed in the compound machine 101 is described.

Figure 16:
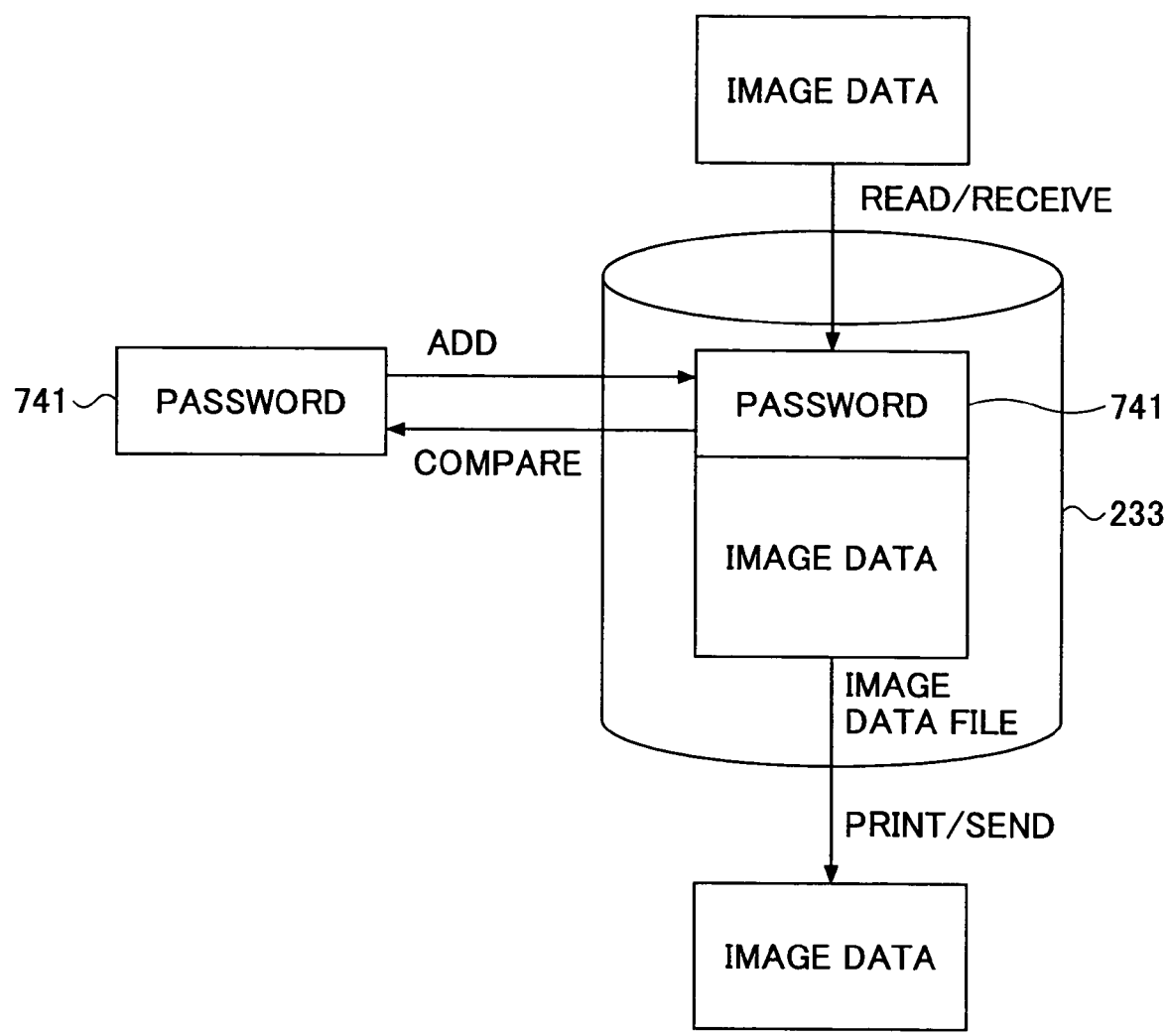
FIG. 16 is a figure for explaining a password for the image forming process.

FIG. 16 is a figure for explaining a password 741 for the image forming process generated by the VAS 135.

In this example, when reading image data to be stored in the compound machine 101 from a document, the scanner application 143 adds the password 741 generated by the VAS 135 to the image data so that the image data is locked with the password. In the same way, when receiving image data from a network, each of the facsimile application 144 and the network file application 145 locks the image data with the password 741.

In this example, when printing the image data stored in the compound machine on a printing paper, the printer application 142 performs password check for the image data by comparing the password generated by the VAS 135 with the password attached to the image data. In the same way, when sending the image data stored in the compound machine 101 to a network, each of the facsimile application 144 and the network file application 145 performs password check for the image data by comparing the password generated by the VAS 135 with the password attached to the image data.

The password 741 may be specific to the SD memory card 602 set in the SD memory card slot 601 of the compound machine 101. In this case, if the SD memory card is changed to another SD memory card from an end of a reading process or a receiving process of image data to a start of a printing process or a sending process, the printing process or the sending process cannot be performed. Thus, the change of the SD memory card 602 can be prevented. The application authentication process becomes more effective if there is a possibility that fraud may be performed for the SD memory card 602.

The password 741 is generated by using a SD serial ID that is an ID specific to each SD memory card 602, for example. The above-mentioned mechanism can be applied to prevention of unauthorized replacement of the HDD 233.

The password 741 may be specific to the body of the compound machine 101. In this case, even when a SD memory card storing image data is moved from another machine to the compound machine 101, the compound machine cannot perform the printing process or the sending process for the image data. Thus, replacement of the SD memory card 602 can be prevented. For example, the password 741 is generated by using a machine number that is specific to each body of the compound machine 101. The above-mentioned mechanism can be applied to prevention of unauthorized replacement of the HDD 233.

Figure 17:
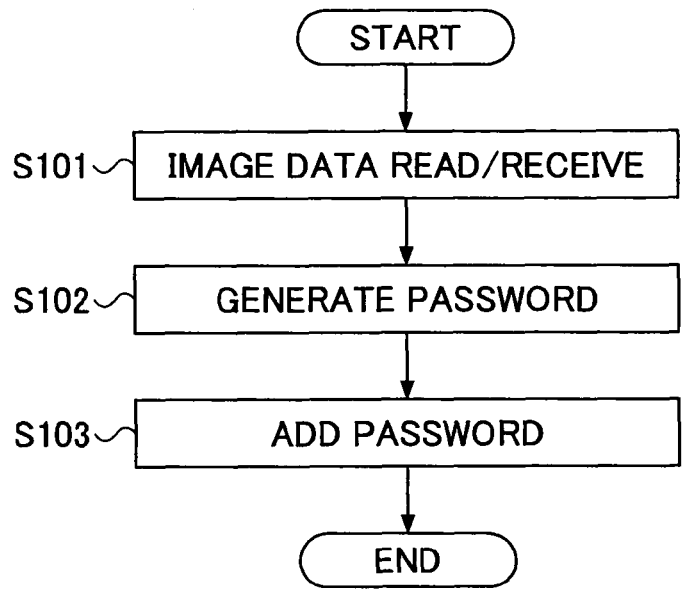
FIG. 17 shows a flowchart of a password adding process.

FIG. 17 shows a flowchart of the password adding process.

An application such as the printer application 142 reads a document to generate image data to be stored in the compound machine 101 or the application receives the data from a network in step 101. Then, the VAS 135 generates the password 741 in step 102. Next, the application adds the password 741 to the image data to lock the image data. Next, the image data is stored in the compound machine 101.

Figure 18:
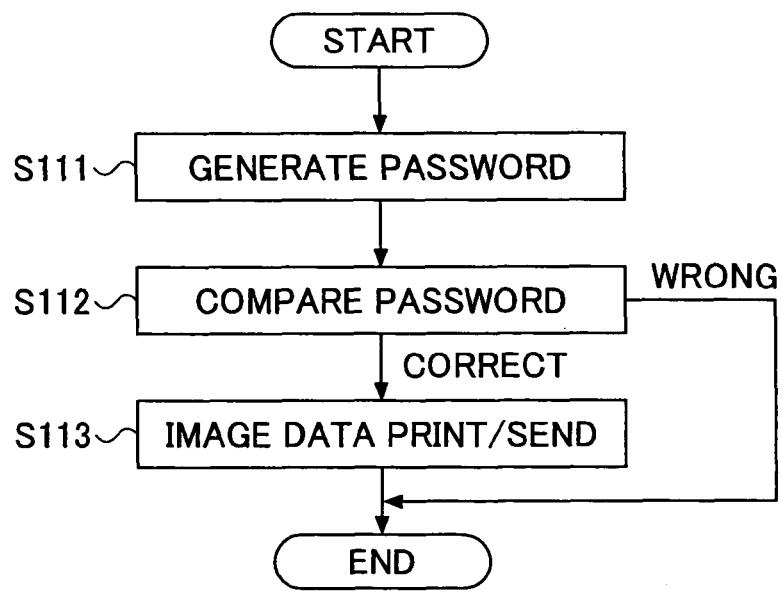
FIG. 18 is a flowchart of a password comparing process.

FIG. 18 is a flowchart of the password comparing process.

When a piece of image data to be printed or to be sent via a network is specified from image data stored in the compound machine 101, the VAS 135 generates the password 741 in step 111. Next, an application such as the printer application 142 compares the password generated by the VAS 135 with the password attached to the image data to check the validity of the password of the image data in step 112. Next, if the password check is successfully done, the application prints the image data or sends the image data via a network in step 113.

Figure 19:
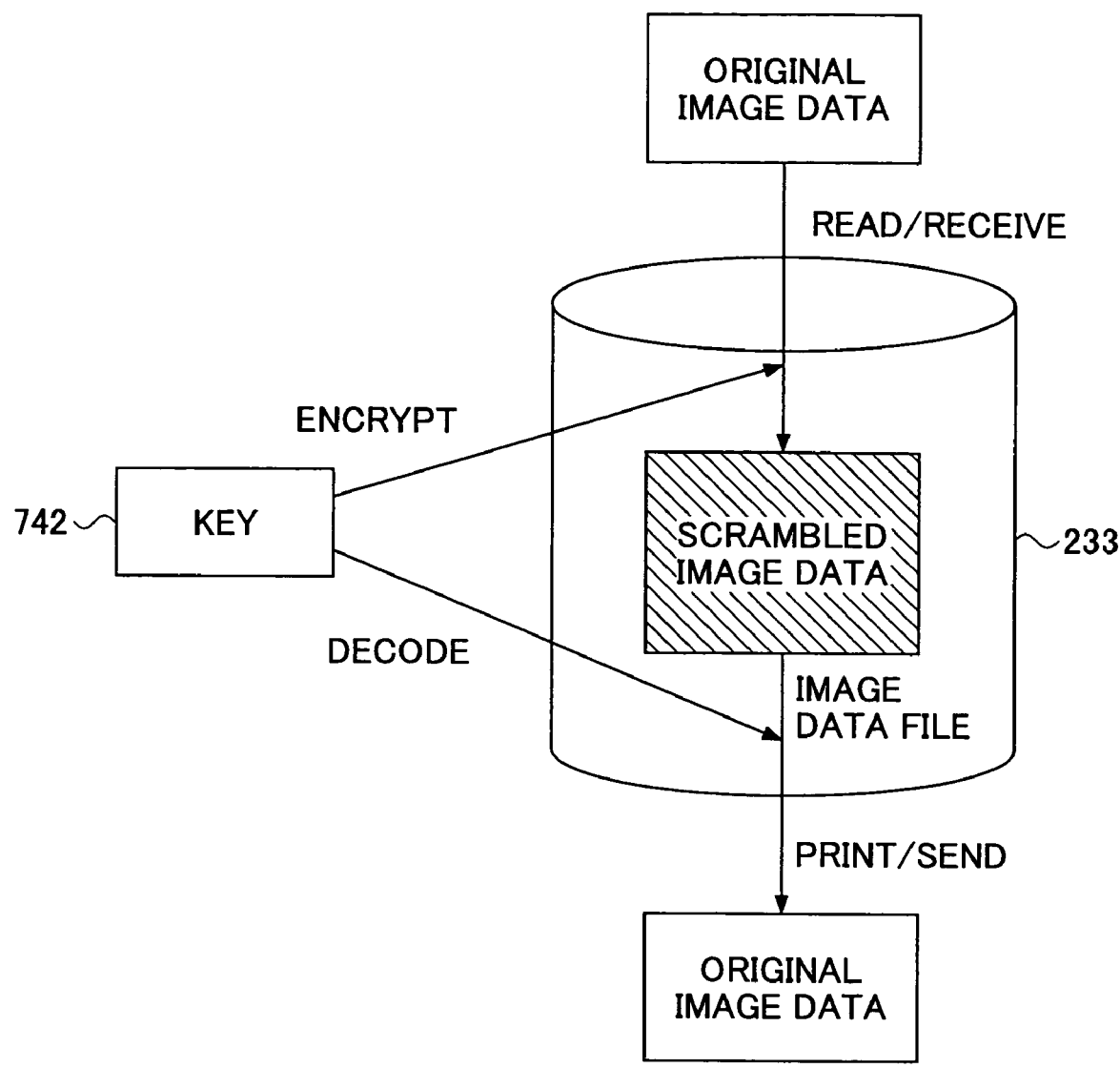
FIG. 19 is a figure for explaining a key used for image forming processes generated by the VAS 135.

FIG. 19 is a figure for explaining a key 742 used for image forming processes generated by the VAS 135.

In this example, when reading image data to be stored in the compound machine from a document, the scanner application 143 encrypts the original image data to a scrambled image data by using the key 742 generated by the VAS 135. In the same way, when receiving image data from a network, the facsimile application 144 or the network file application 145 encrypts the original image data into the scrambled image data by using the key 742.

When printing the image data stored in the compound machine 101, the printer application 142 decodes the scrambled image data into the original image data by using the key 741. In the same way, when sending the image data stored in the image forming apparatus 101 to the network, the facsimile application 144 or the network file application 145 decodes the scrambled data to the original image data by using the key 741.

The key 741 may be data for encryption specific to the SD memory card 602 set in the SD memory card slot 601 of the compound machine 101. In this case, if the SD memory card is changed to another SD memory card from an end of a reading process or a receiving process of image data to a start of a printing process or a sending process, the printing process or the sending process cannot be performed. Thus, the change of the SD memory card 602 can be prevented. If there is a possibility that fraud may be performed for the SD memory card 602, the application authentication process becomes more effective.

For example, the key 742 is generated by using a SD serial ID that is an ID specific to each SD memory card 602. The above-mentioned mechanism can be applied to prevention of unauthorized replacement of the HDD 233.

The key 742 may be specific to the body of the compound machine 101. In this case, even when a SD memory card storing image data is moved from another machine to the compound machine 101, the compound machine 101 cannot perform the printing process or the sending process for the image data. Thus, replacement of the SD memory card 602 can be prevented. For example, the key 742 is generated by using a machine number that is specific to each body of the compound machine 101. The above-mentioned mechanism can be applied to prevention of unauthorized replacement of the HDD 233.

Figure 20:
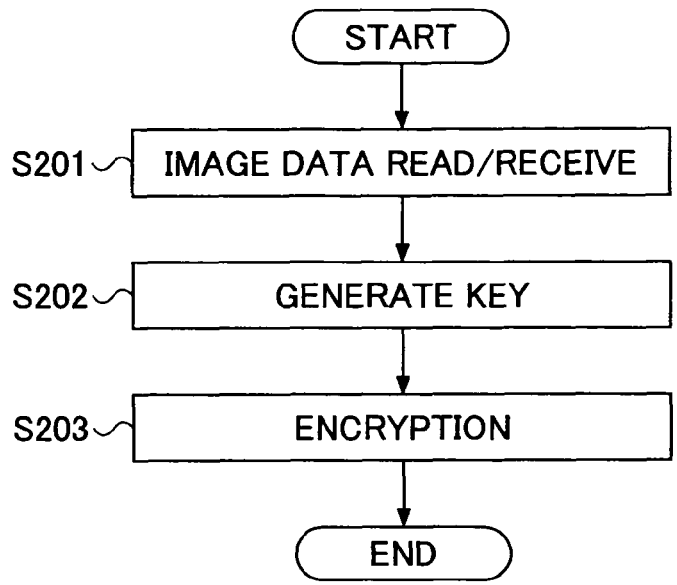
FIG. 20 shows a flowchart of an encryption process.

FIG. 20 shows a flowchart of the encryption process.

When an application such as the printer application 142 reads image data to be stored in the compound machine or receives the image data from a network in step 201, the VAS 135 generates a key 742 in step 202. Next, the application 142 encrypts the image data by using the key 742 in step 203. Next, the compound machine 101 stores the image data.

Figure 21:
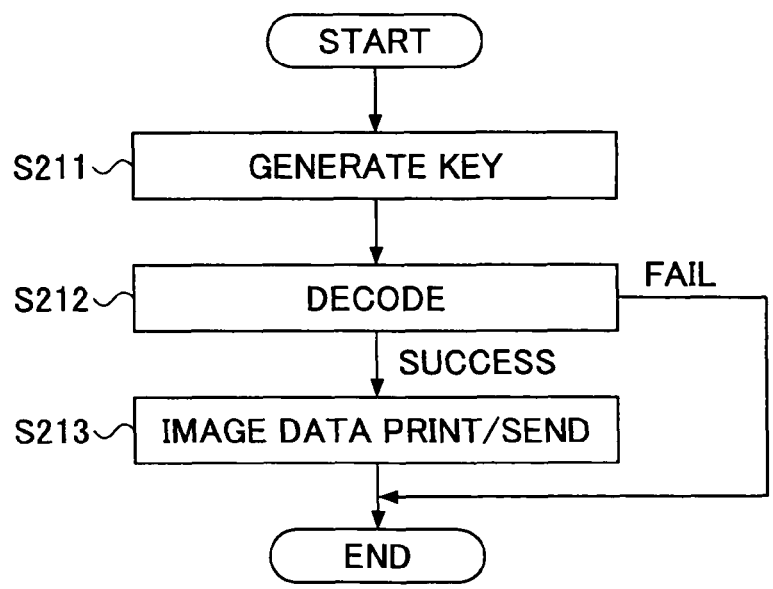
FIG. 21 shows a flowchart of a decoding process.

FIG. 21 shows a flowchart of the decoding process.

When image data to be printed or to be sent to a network is specified, the VAS 135 generates a key 742 in step 211. Next, the application decodes the image data by using the key 742 in step 212. Next, if the decoding process is successfully performed, the application prints the image data or sends the image data to the network in step 213.

In the above-mentioned image forming process, both of the password 741 and the key 742 can be used for the image data. In addition, in the image forming process, when more than one SD memory cards are set in the compound machine 101, the password 741 or the key 742 may be specific to a specific SD memory card 602.

The compound machine 101 is an example of the information processing apparatus of the present invention. Information processing performed in the compound machine 101 is an example of the information processing method of the present invention. A program that causes the compound machine 101 to perform the information processing is an example of the information processing program of the present invention, and a SD memory card or a CD-ROM storing the information processing program is an example of the computer readable medium of the present invention.

The present invention is not limited to the specifically disclosed embodiments, and variations and modifications may be made without departing from the scope of the present invention.

The present application contains subject matter related to Japanese patent application No. 2003-292012, filed in the JPO on Aug. 12, 2003, Japanese patent application No. 2003-292013, filed in the JPO on Aug. 12, 2003, Japanese patent application No. 2003-292014, filed in the JPO on Aug. 12, 2003, Japanese patent application No. 2003-292015, filed in the JPO on Aug. 12, 2003, Japanese patent application No. 2003-292016, filed in the JPO on Aug. 12, 2003, Japanese patent application No. 2004-81476, filed in the JPO on Mar. 19, 2004, and Japanese patent application No. 2004-230105, filed in the JPO on Aug. 6, 2004, the entire contents of which being incorporated herein by reference.

What is claimed is:

1. An information processing apparatus including a recording medium setting unit in which a recording medium is set, the information processing apparatus comprising:
    a validity determination unit configured to determine validity of a program, which is stored in the recording medium, based on first validity determination data, which is stored in the recording medium, on the basis of a first comparison between a hash code generated from the program and a hash code obtained by decoding the first validity determination data, and a second comparison between machine specific data, that is specific to the information processing apparatus and which is obtained from the information processing apparatus, and machine specific data obtained by decoding the first validity determination data that is obtained from the recording medium, and in the second comparison, when the machine specific data obtained by decoding the first validity determination data is a predetermined number that indicates no specific machine, the second comparison is determined to be valid;
    a validity determination data generating unit configured to generate second validity determination data including the hash code generated from the program and the machine specific data that is specific to the information processing apparatus when in the second comparison the machine specific data obtained by decoding the first validity determination data indicates no specific machine; and
    an overwriting unit configured to overwrite the first validity determination data on the recording medium with the second validity determination data generated by the validity determination data generating unit when in the second comparison the machine specific data obtained by decoding the first validity determination data indicates no specific machine.

2. The information processing apparatus as claimed in claim 1, the information processing apparatus further comprising:
    a storing unit configured to store the machine specific data that is specific to the information processing apparatus into the recording medium set in the recording medium setting unit.

3. The information processing apparatus as claimed in claim 1, the information processing apparatus further comprising:
    an installing unit configured to install the program into the information processing apparatus when the program is determined to be valid.

4. The information processing apparatus as claimed in claim 1, the information processing apparatus further comprising:
    an updating unit configured to update the program in the information processing apparatus.

5. The information processing apparatus as claimed in claim 1, wherein the recording medium is a memory card.

6. The information processing apparatus as claimed in claim 1, wherein the information processing apparatus is an image forming apparatus.

7. The information processing apparatus as claimed in claim 6, wherein the information processing apparatus further comprises:
    an adding unit configured to add data specific to the recording medium or specific to the information processing apparatus to image data that is obtained by reading a document or by receiving the image data via a network; and
    a comparing unit configured to compare the data specific to the recording medium or specific to the image forming apparatus with data added to the image data to be printed on a paper or to be sent via a network.

8. The information processing apparatus as claimed in claim 6, wherein the information processing apparatus further comprises:
    an encryption unit configured to encrypt image data that is obtained by reading a document or by receiving the image data via a network with a key specific to the recording medium or specific to the information processing apparatus; and
    a decoding unit configured to decode the image data to be printed on a paper or to be sent via a network with the key.

9. The information processing apparatus as claimed in claim 1, wherein the machine specific data specific to the information processing apparatus is any one of a machine number of the information processing apparatus, a MAC address of the information processing apparatus and an IP address of the information processing apparatus.

10. The information processing apparatus as claimed in claim 1, wherein
    when the machine specific data obtained by decoding the first validity determination data is not the same as at least one of the machine specific data that is specific to the information processing apparatus and the predetermined number, then the first validity determination data is determined to be invalid.

11. An information processing method performed in an information processing apparatus including a recording medium setting unit in which a recording medium is set, the information processing method comprising:

determining, at a validity determination unit, validity of a program, which is stored in the recording medium, based on first validity determination data, which is stored in the recording medium on the basis of a first comparison between a hash code generated from the program and a hash code obtained by decoding the first validity determination data, and a second comparison between machine specific data, that is specific to the information processing apparatus and which is obtained from the information processing apparatus, and machine specific data obtained by decoding the first validity determination data that is obtained from the recording medium, and in the second comparison, when the machine specific data obtained by decoding the first validity determination data is a predetermined number that indicates no specific machine, the second comparison is determined to be valid;

generating, at a validity determination data generating unit, second validity determination data including the hash code generated from the program and the machine specific data that is specific to the information processing apparatus when in the second comparison the machine specific data obtained by decoding the first validity determination data indicates no specific machine; and overwriting, at an overwriting unit, the first validity determination data on the recording medium with the second validity determination data generated by the validity determination data generating unit when in the second comparison the machine specific data obtained by decoding the first validity determination data indicates no specific machine.

12. The information processing method as claimed in claim 11, further comprising:

storing the machine specific data that is specific to the information processing apparatus into the recording medium set in the recording medium setting unit.

13. The information processing method as claimed in claim 11, further comprising:

installing the program into the information processing apparatus when the program is determined to be valid.

14. The information processing method as claimed in claim 11, further comprising:

updating the program in the information processing apparatus.

15. The information processing method as claimed in claim 11, wherein the recording medium is a memory card.

16. The information processing method as claimed in claim 11, wherein the information processing apparatus is an image forming apparatus.

17. The information processing method as claimed in claim 16, further comprising:

adding data specific to the recording medium or specific to the information processing apparatus to image data that is obtained by reading a document or received via a network; and comparing the data specific to the recording medium or specific to the image forming apparatus with data added to the image data to be printed on a paper or to be sent via a network.

18. The information processing method as claimed in claim 16, further comprising:

encrypting image data that is obtained by reading a document or by receiving the image data via a network with a key specific to the recording medium or specific to the information processing apparatus; and decoding the image data to be printed on a paper or to be sent via a network with the key.

19. The information processing method as claimed in claim 11, wherein the machine specific data specific to the information processing apparatus is any one of a machine number of the information processing apparatus, a MAC address of the information processing apparatus and an IP address of the information processing apparatus.

20. A non-transitory computer readable storage medium storing computer executable instructions for causing an information processing apparatus to perform an information processing method, the information processing apparatus including a recording medium setting unit in which a recording medium is set, the information processing method comprising:

determining, at a validity determination unit, validity of a program, which is stored in the recording medium, based on first validity determination data, which is stored in the recording medium on the basis of a first comparison between a hash code generated from the program and a hash code obtained by decoding the first validity determination data, and a second comparison between machine specific data, that is specific to the information processing apparatus and which is obtained from the information processing apparatus, and machine specific data obtained by decoding the first validity determination data that is obtained from the recording medium, and in the second comparison, when the machine specific data obtained by decoding the first validity determination data is a predetermined number that indicates no specific machine, the second comparison is determined to be valid;

generating, at a validity determination data generating unit, second validity determination data including the hash code generated from the program and the machine specific data that is specific to the information processing apparatus when in the second comparison the machine specific data obtained by decoding the first validity determination data indicates no specific machine; and overwriting, at an overwriting unit, the first validity determination data on the recording medium with the second validity determination data generated by the validity determination data generating unit when in the second comparison the machine specific data obtained by decoding the first validity determination data indicates no specific machine.

21. The non-transitory computer readable storage medium as claimed in claim 20, the information processing method further comprising:

storing the machine specific data that is specific to the information processing apparatus into the recording medium set in the recording medium setting unit.

22. The non-transitory computer readable storage medium as claimed in claim 20, the information processing method further comprising:

installing the program into the information processing apparatus when the program is determined to be valid.

23. The non-transitory computer readable storage medium as claimed in claim 20, the information processing method further comprising:
   updating the program in the information processing apparatus.

24. The non-transitory computer readable storage medium as claimed in claim 20, wherein the recording medium is a memory card.

25. The non-transitory computer readable storage medium as claimed in claim 20, wherein the information processing apparatus is an image forming apparatus.

26. The non-transitory computer readable storage medium as claimed in claim 20, wherein the machine specific data specific to the information processing apparatus is any one of a machine number of the information processing apparatus, a MAC address of the information processing apparatus and an IP address of the information processing apparatus.

* * * * *